United States Patent [19]

Bernhart et al.

[11] 4,143,360

[45] Mar. 6, 1979

[54] METHOD AND APPARATUS FOR CONTROLLING A DISPLAY TERMINAL

[75] Inventors: James I. Bernhart; James W. Nobles; Ronald L. White, all of Fort Wayne, Ind.

[73] Assignee: The Magnavox Company, Fort Wayne, Ind.

[21] Appl. No.: 720,702

[22] Filed: Aug. 27, 1976

[51] Int. Cl.[2] .......................... G06K 15/18; G06F 3/14

[52] U.S. Cl. .................................... 340/711; 364/518; 340/706; 340/779; 340/799

[58] Field of Search ........................ 340/324 A, 324 M

[56] References Cited

U.S. PATENT DOCUMENTS

| | | | |
|---|---|---|---|
| 3,675,208 | 7/1972 | Bard | 340/324 A |
| 3,713,134 | 1/1973 | Chaney | 340/324 A |
| 3,812,485 | 5/1974 | Moreton | 340/324 A |
| 3,848,246 | 11/1974 | Kendall et al. | 340/324 A |
| 3,962,700 | 6/1976 | Criscimagna et al. | 340/324 M |

*Primary Examiner*—David L. Trafton

*Attorney, Agent, or Firm*—Thomas A. Briody; William J. Streeter; William J. Iseman

[57] ABSTRACT

A versatile display terminal having the capability of off-line operation or on-line operation in conjunction with a variety of computer systems. The display terminal has a programmable microprocessor and ROM and RAM memories thereby providing the capability of working independently of a central computer. The programmable microprocessor provides a high degree of flexibility for satisfying special requirements with minimal hardware changes. The display terminal preferably has a display panel operable with digital inputs. A vector generator employs a unique method of generating a vector display on the panel. A character generator has the capability of generating standard display terminal characters as well as special characters.

8 Claims, 7 Drawing Figures

METHOD AND APPARATUS FOR CONTROLLING A DISPLAY TERMINAL

BACKGROUND OF THE INVENTION

This invention relates to display terminals and more particularly to a versatile display terminal having the capability to operate independently of a central computer.

In the past, most display terminals were designed to operate in conjunction with a central computer. An example of such a terminal is shown in U.S. Pat. No. 3,911,417 which issued to Stifle.

A display terminal that operates in conjunction with a central computer is sometimes required to wait for the central computer to finish communications with other display terminals since it is not practical to have only one display terminal operating in conjunction with one central computer. In an educational or instructional application, many terminals may be required. It will therefore be appreciated that it would be desirable to have display terminals with the capability to complete an entire instructional session or routine without periodic communications with the central computer.

Accordingly, an object of the present invention is to provide a display terminal which has the capability to function without continuously being connected to a central computer.

Another object is to provide a vector generator which does not employ a comparator to determine when the final point of the vector has been reached.

A further advantage of the present invention is to provide a terminal display adaptable to various functional requirements such as interface formats, alternate command structures, and various performance capabilities.

Yet another object of the present invention is to provide a display terminal that has the capability of being programmable so that it helps ease the capacity requirements on a central computer.

Yet a further object is to provide a method of generating a vector that does not require comparing a present address with a final address to determine when the final vector point has been reached.

SUMMARY OF THE INVENTION

In carrying out the above and other objects of the invention in one form, we provide an improved display terminal. The display terminal has a microprocessor and means to input information thereto. A vector generator has a delta register to contain a slope of a vector to be generated. The contents from the delta register are successively added to a summing register. The vector generator also has an address register to contain the address of the present location of the display panel. This address is incremented each time the summing register overflows. A counter with a capacity equal to the number of addresses for one coordinate axis of the display panel is also used. The counter has a first output coupled to the summing register to cause the summing register to perform a summing operation a number of times equal to the number of addresses of one coordinate axis. A second output of the counter causes a signal to be sent to the microprocessor to indicate to the microprocessor the completion of generation of the vector. The display terminal also has a character generator and memory storage capacity. Some of the memory is of the read only memory (ROM) type and stores standard characters which can be displayed on the display panel. In addition, the display terminal includes a versatile input/output interface unit to interface with a keyboard input and to interface with an external central computer and other ancilliary components.

Also provided is a method of generating a vector comprising receiving final point information from the input/output interface or from an internal program wherein the final point information is an end point address of the vector, and reading into a microcomputer the present address or point location on the display panel which represents the starting point of the vector. Determining the slope of the vector by subtracting the starting point from the final point in the X-coordinate axis and subtracting the starting point from the final point in the Y-coordinate axis. Determining the direction of change from the starting point. Entering into an X and a Y delta register, the difference obtained when subtracting the starting points from the final points for each respective coordinate points. Presetting the X summing register and the Y summing register to one-half. Successively adding to each summing register contents from a corresponding delta register and incrementing, in proper direction, a corresponding X and Y address which contains the present address selected on the display panel. The adding and incrementing is repeated a predetermined number of times which is equal to the number of addresses in one coordinate axis.

A method is also provided for generating characters on the display panel. The character code is received by the microcomputer and then the start address of the location where the character pattern information is stored is derived by multiplying a character code by a predetermined number and adding an offset thereto. Character data is then fetched from the memory and sent to a data pattern register where it is incremently shifted to the digital display panel. This procedure is repeated until an entire character pattern has been sent to the digital display panel.

The subject matter which we regard as our invention is set forth in the appending claims. The invention itself, however, together with further objects and advantages thereof, may be better understood by referring to the following detailed description taken in conjunction with the accompanying drawings.

The exemplifications set out herein illustrate the preferred embodiments of the invention in one form thereof, and such exemplifications are not to be construed as limiting in any manner.

DESCRIPTION OF THE PREFERRED EMBODIMENTS

Figure 1:
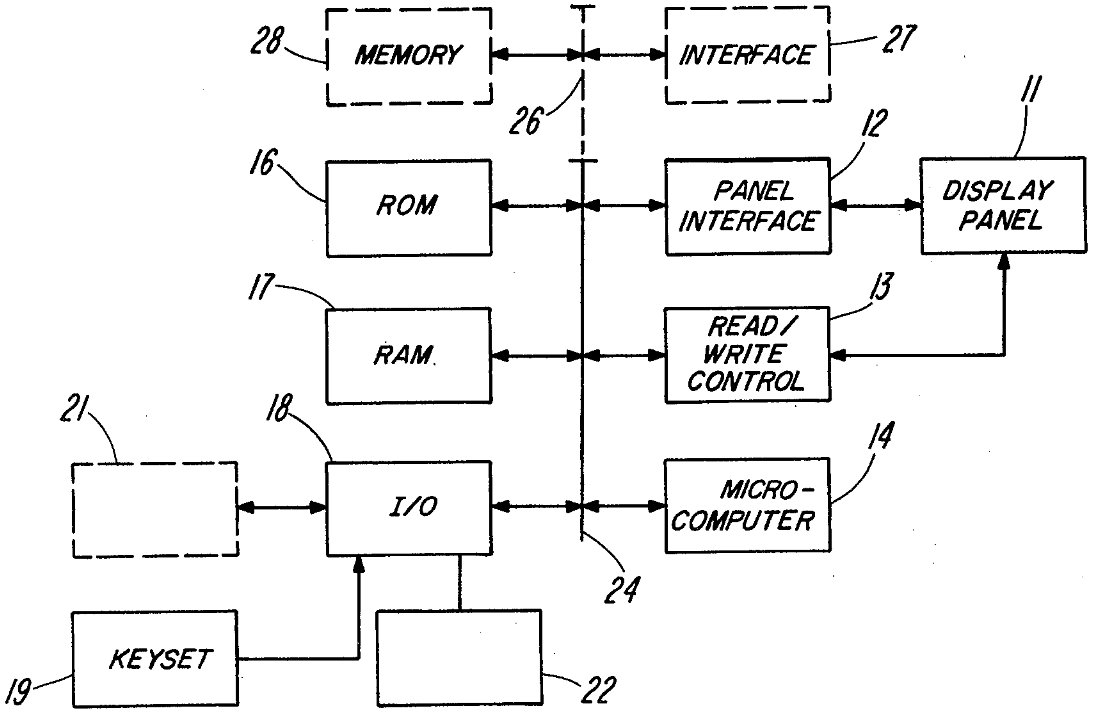
FIG. 1 illustrates in simplified block diagram form a terminal display system.

Referring now to FIG. 1, there is illustrated a simplified block diagram of a display terminal. Preferably display unit 11 is a plasma panel display device wherein the viewing matrix of the display is formed by a grid of 512 × 512 lines. Owens-Illinois markets one such unit under the trade name Digivue 512-60 plasma display unit. Although it will be understood that any display unit capable of accepting and displaying digital information could be used. Display unit 11 is connected to panel interface 12. In the preferred embodiment, wherein display unit 11 is a plasma display panel it will be understood that display 11 contains all the necessary decoders, encoders, drivers and sustaining signal generators necessary to receive digital address and control signals to generate a display and to sustain such generated display. U.S. Pat. No. 3,559,190 which issued to D. L. Bitzer, et al. discloses such a plasma display unit.

Panel interface 12 is connected to a bus 24. Bus 24 carries address, data, and control signals. Although illustrated as one bus, it will be understood by those persons skilled in the art that three separate signal paths are contained within bus 24. Read/write control 13 feeds the proper instructions to display panel 11 to enable the displaying of the desired vector or character. Read/write control 13 also includes output registers which interface the signals from read/write control 13 to panel interface 12. Panel interface 12 also had address registers whose outputs go to display panel 11 to instruct display panel 11 where to erase or write the vector or character information sent to the display panel.

Microcomputer 14 along with read only memory (ROM) 16 and read/write memory (RAM) 17 give the display terminal the capability of performing many routines independently of a central computer. Memories 16 and 17 along with microcomputer 14 are connected to bus 24. The display terminal also has an input/output interface 18 which is connected to bus 24 and serves as an interface unit to receive inputs external from the display terminal. Keyset or keyboard input 19 is connected to input/output interface 18 and allows an operator to manually input information into the display terminal or to command the display terminal to perform certain functions. Input/output interface 18 also has the capability of interfacing with other peripheral units such as a touch panel input source 22. Preferably, input/output interface 18 operates in accordance with EIA standard RS-232C bit serial, asynchronous, full duplex signals.

Shown in phantom is a central computer 21 which also can be connected to input/output interface 18. This arrangement of the display terminal provides for a versatile graphics display terminal capable of on-line operation with an external computer system by direct connection or by modems and long distance telephone lines. Bus 26 shown in phantom is an extension of bus 24 and provides for additional capability to be added to the display terminal. Also shown in phantom is an interface 27 and a memory 28 which are connected to bus 26 and are optional units which can provide additional capability. Interface unit 27 provides for additional interface such as with a line printer, matrix printer, etc.

Figure 2:
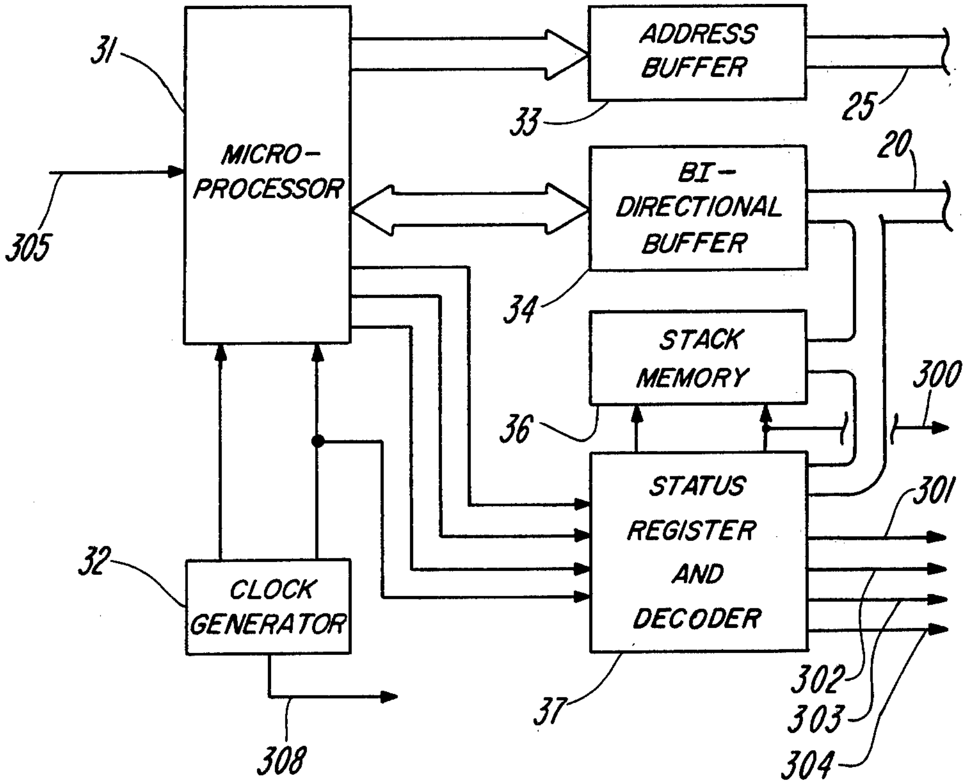
FIG. 2 is a block diagram of the microcomputer used in the display terminal of FIG. 1.

FIG. 2 illustrates the microcomputer 14 of FIG. 1 in greater detail. The microcomputer consists of a basic microprocessor 31, a clock generator 32, a stack memory 36, a status register and decoder 37, an address buffer 33, and a bi-directional buffer 34. The microcomputer contains all the logic required of a central processing unit. A commercially available 8080A microprocessor can be used as microprocessor 31 which serves as the central processor unit for the terminal. The microprocessor chip is driven by clock generator 32. In the preferred embodiment clock generator 32 is a two phased, non-overlapping, clock with a built-in crystal reference. Such a clock generator is a Motorola clock oscillator K1117A. Outputs from clock generator 32 provide time gating information to the memories, input/output channels and interrupt circuitry.

One of the prime functions of microprocessor 31 is to monitor other units within the display terminal to determine when new data is available or when an operation is complete. Microprocessor 31 also maintains control over various display terminal components. Status register and decoder 37 provides control signals to portions of the terminal display which indicate the status of data bus 20 and address bus 25. These control signals are used in identifying the destination or origination points for various data that is transferred from one point to another within the display terminal.

Stack memory 36 is a read/write memory used by microprocessor 31 as a temporary storage location for program variables. Stack memory 36 is separated from other memories within the display terminal because of the type of information usually stored in stack memory 36 such as data which results from program execution. The data stored in RAM memory 17 (FIG. 1) is of a more permanent nature or of a specific sequence nature so that its use is more structured than that stored in stack memory 36. National Semiconductor makes a memory MM2101 which meets the requirements for stack memory 36.

Address buffer 33 provides drive capability for the address outputs of microprocessor 31. Address buffer 33 provides the communications between microprocessor 31 and other portions of the display terminal by indicating the memory location which is to be either read or written depending upon the function commanded by microprocessor 31. The addresses carried through address buffer 33 also go to other locations within the display terminal which are addressable. Bi-directional buffer 34 serves the purpose of interfacing microprocessor 31 with data bus 20 which carries input/output data to various parts of the display terminal. A satisfactory address buffer 33 was found to be a Signetics 8T97 while a Signetics 8T33 satisfactorily served as bi-directional buffer 34.

The signal on line 300 is a read/write signal that goes to stack memory 36 and the RAM memory. It is a logic signal whose true condition designates a stack or RAM memory write i.e., data on data bus 20 is to be stored in the memory location designated by address bus 25. The true condition of the logic signal on line 300 will occur in conjunction with a logic signal on line 301. The signal carried by line 301 is enable memory signal, a logic signal whose true condition designates a memory operation. If the enable memory signal is a logic true and the signal appearing on line 300 is false a ROM or RAM memory read operation occurs.

Line 302 carries an interrupt response signal which goes to an interrupt circuit (not shown). The interrupt circuit generates the coding for a NOP (no operation) signal which causes a programmed halt to be skipped and data processing continues. Lines 303 and 304 go to decoders (which are discussed hereinafter) and cause the decoders to permit data on data bus 20 to go to or come from a desired location within the display terminal.

Figure 3:
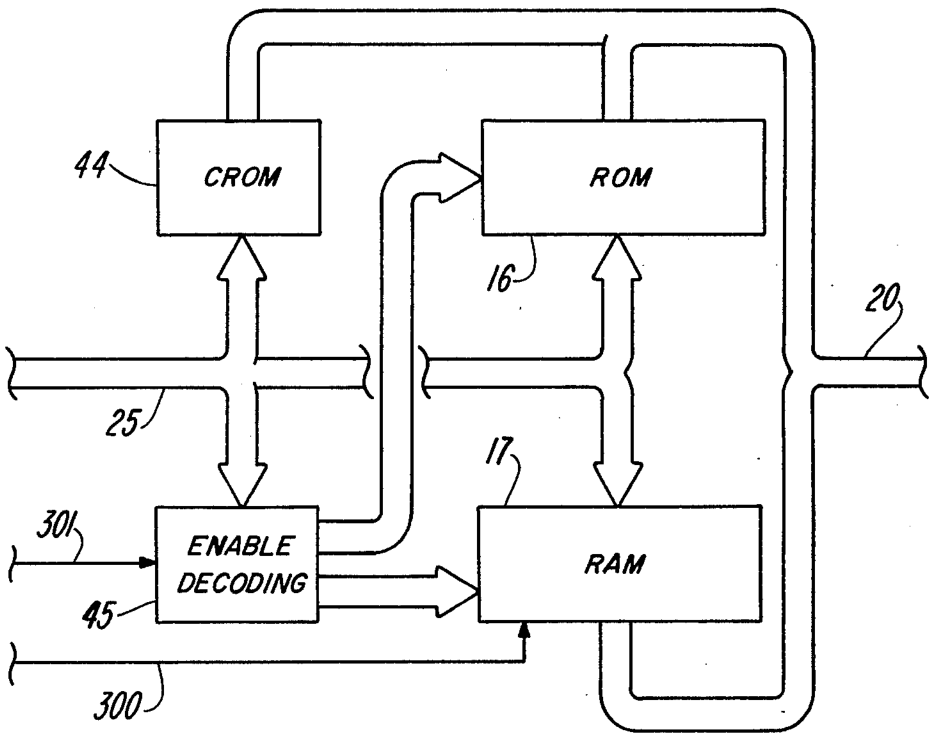
FIG. 3 illustrates the memory arrangement in block diagram form for the terminal display.

The preferred memory arrangement for the display terminal is illustrated in block diagram form in FIG. 3. ROM 16 is a read only memory and contains fixed information such as information necessary to generate standard characters on the display panel. There is also provided a control ROM 44 which contains a set of routing instructions that in effect determine the display terminal characteristics. Control ROM 44 contains a mapping program that determines the set of subroutines that make up the characteristics of a particular display terminal. This unique arrangement allows a high degree of flexibility in adapting to various applications. Subroutines required by most applications appear in the main program and only the control ROM 44 needs to be reprogrammed to call out any desired subset. In one display terminal, four INTEL C2708's were used for ROM 16 while only one INTEL C2708 was required for ROM 44. An address selector or address decoder 45 receives an input from status register 37 (FIG. 2) on line 301 to enable the memories. A portion of the address word is received on address bus 25 by address decoder 45 where it is decoded and then enables a selected memory device. Address decoder 45 is a one-out-of-sixty-four decoder which means it selects one memory device out of sixty-four possibilities. RAM 17 is a read/write memory and as the name implies is a memory that the microprocessor 31 (FIG. 2) can write data into or read data from. RAM 17 is used for data storage that is likely to be variable such as pattern information for plotting a special character. Also RAM 17 might contain an instruction set for a program to be executed.

In operation all the control firmware for the display terminal is contained in the fixed portion of the memory section. These programs are executed by the microcomputer 14 (FIG. 1) in response to inputs received from the keyboard 19, central computer 21, or other interfaces that might be attached to the microcomputer. Some examples of programs that could be executed are plotting of an alphanumeric symbol, plotting of a special graphics symbol, plotting of a vector (line segment), outputting a keyboard character to the communication interface, plotting data from the programmable memory, inputting or outputting data to or from additional interfaces, loading data into the programmable memory, and performing non-plotting functions resulting from inputs from the communications interface or keyboard.

The firmware for use with the memories can be compatible with many different interface languages. The peferred firmware, however, uses a standard 7-bit plus parity American Standard Code for Information Interchange (ASCII). In using this format, two major operating modes are defined which are ASCII and Graphics. In the ASCII mode both the standard printing and non-printing codes are defined. Upon receipt of a predetermined non-printing code, the graphics mode is entered during which groups of three eight-bit words determine the terminal operation. In such a mode, four types of terminal operation may be performed. The first type is a point plotting mode wherein any single point on the display panel may be written or erased. The address of each point is extracted from each set of three input words. The second mode is a line drawing mode wherein the data provided by each set of three input words defines the end point location of a line drawn from the current display location. A third mode is a character plotting mode wherein three characters may be plotted for each set of three input words. The data in this case specifies the memory location of the characters. The fourth mode is a programmable character loading mode wherein the input data is loaded into RAM 17. Such input data would define a special user programmable character set.

Character data received in the ASCII mode is interpreted as either printing or non-printing. During the character printing operation, a look ahead algorithm provides an automatic check to insure that the character printed will always be complete in either horizontal or vertical direction.

Figure 4:
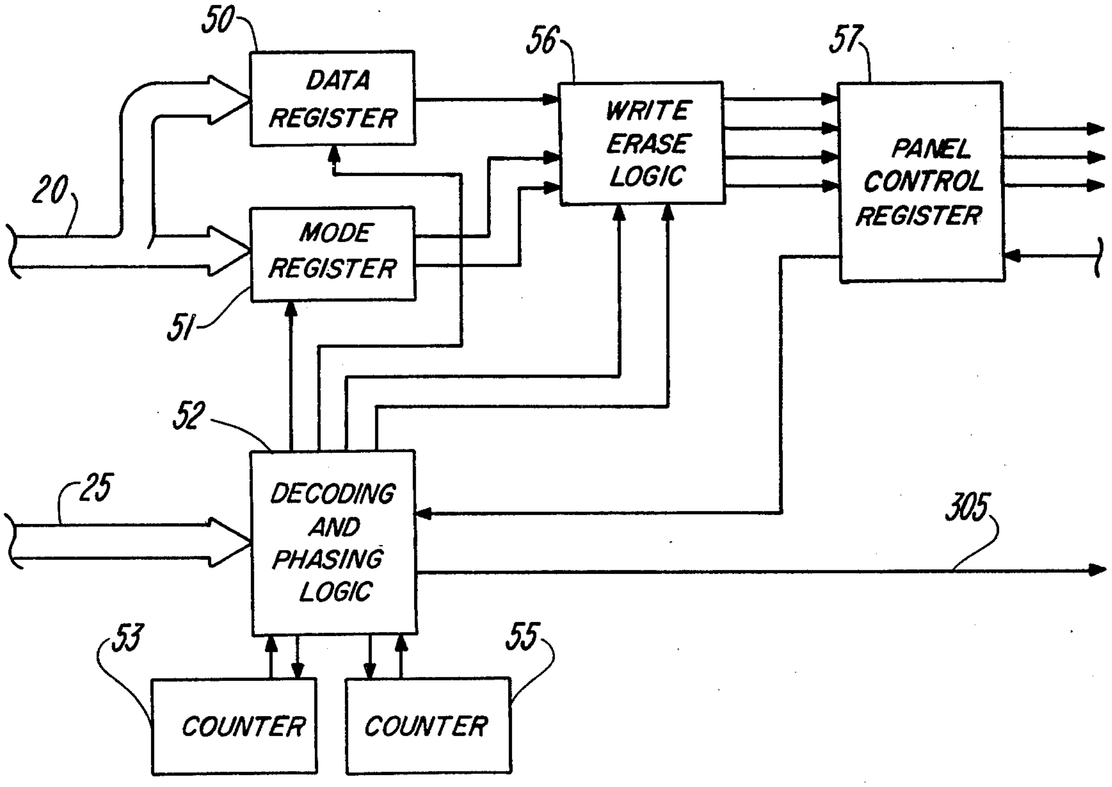
FIG. 4 illustrates in simplified block diagram form the display panel interface for the terminal display.

FIG. 4 is a simplified block diagram of read/write 13 shown in FIG. 1. The circuitry of FIG. 4 provides a basic control for a display panel by generating control signals to the display panel which cause points on the panel to be either written or erased. Addressing information for this circuitry is received on address bus 25 and fed into decoding and phasing logic 52. Input data is carried on data bus 20 into data register 50 and mode register 51. Counter 53 and counter 55 interface with decoding and phasing logic 52. Counter 53 is a 512-bit counter while counter 55 is an 8-bit counter. Panel control register 57 is a series of buffers that interfaces with display unit 11 (FIG. 1). Logic circuitry 56 contains circuitry for providing write and erase signals for the display panel. Logic circuitry 56 also contains circuitry which generates a command to bulk erase the screen for erasing the entire screen or display panel. In plotting on a display panel, a panel address or point location is required along with the plotting information. For this display terminal this is provided for by registers in panel interface 12 (FIG. 1) along with the circuitry in FIG. 4.

The signals coming from logic circuitry 56 are generated in accordance with the status information previously stored in mode regiser 51. This information is a record indicating which one of four different modes the data to be displayed is to be interpreted. One such mode is a normal mode wherein all background in a matrix is erased and a desired symbol or character is written. The term "background" applies only to the rectangular space allocated for display of one character or symbol. The second mode is called an inverse mode wherein the entire background in the matrix is written and then predetermined points are erased to display the character or symbol—this is the exact inverse of the normal mode. The third mode is an overstrike mode wherein nothing is done to the background and only the points corresponding to the desired character or symbol that is defined by the memory is written. The fourth mode is an erase mode wherein nothing is done to the background and only the points defined by the data stored in the memory for the desired signal are erased.

Counter 55 and decoding and phasing logic 52 operate in conjunction with data register 50 and panel interface 12 (FIG. 1) in order to plot a character on the display panel. Symbols or characters are displayed on the display panel in an 8 × 16 character matrix. A character is plotted on the display panel by outputting sixteen 8-bit words which correspond to the sixteen rows in the character matrix. Data for the first row is set into data pattern register 50 and the logic circuit is then given a start command. The 8-bits are then plotted under the control of mode register 51 and the logic circuitry to result in one row being plotted on the display panel. After the 8-bits have been plotted, decoding and phasing logic 52 generates an interrupt signal which indicates to the microprocessor 31 (FIG. 2) that the 8-bits have been plotted. The interrupt signal is fed on line 305 to the microprocessor. Microprocessor 31 then loads the data for the next row and restarts the process which is continued until an entire character space has been plotted. It will now be apparent that microcomputer 31 fetches the data pattern from memory and provides the data pattern along with the signal to start plotting a character or symbol on the display panel. The interface unit can be used to drive any type of display unit capable of accepting and displaying digital information.

Figure 5:
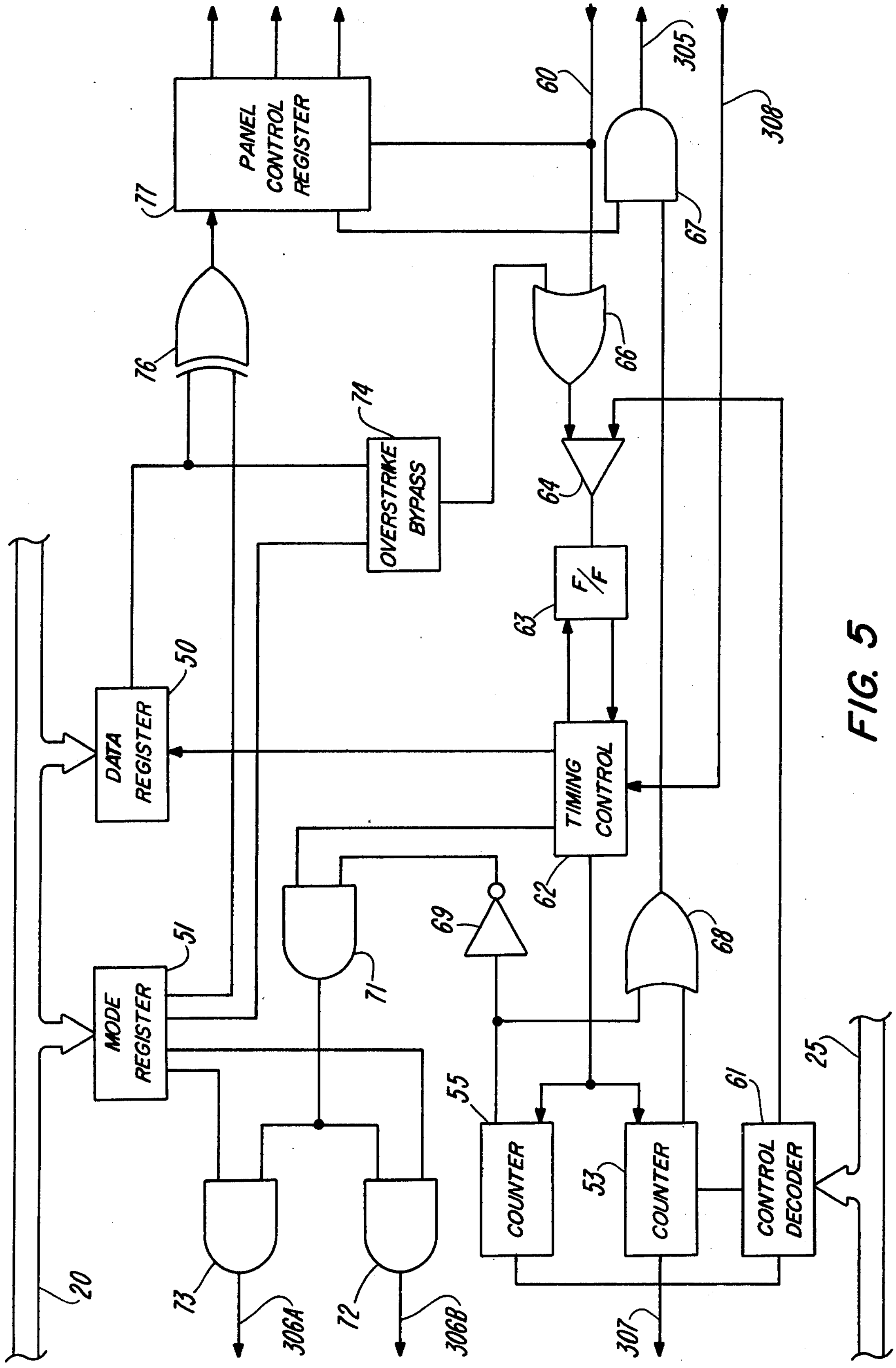
FIG. 5 illustrates in greater detail the display panel interface of FIG. 4.
Figure 6:
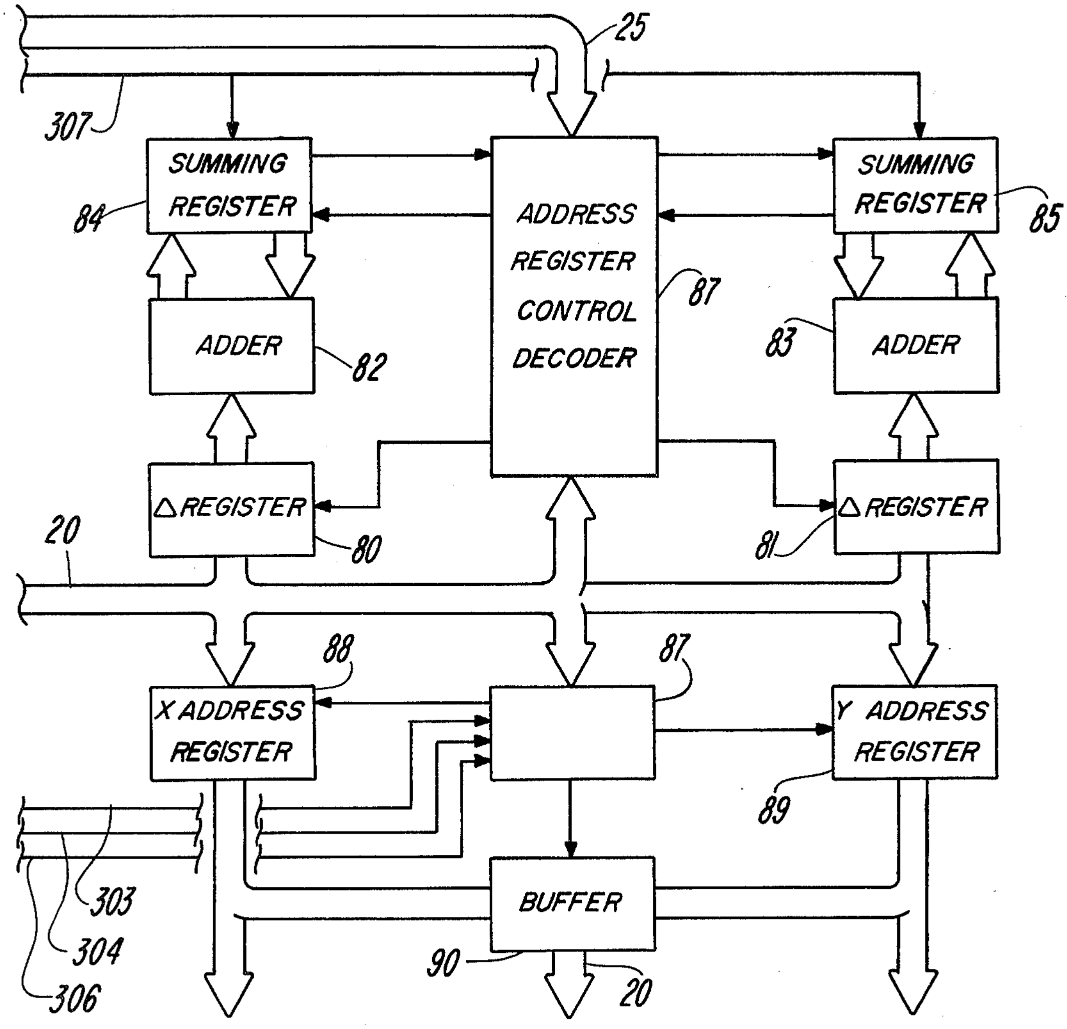
FIG. 6 illustrates in block diagram form the vector generator and panel address registers for the display terminal.

FIG. 5 is a more detailed diagram of the panel interface of FIG. 4. Mode register 51 is a register wherein three bits are used to indicate which of the four display modes will be used, i.e., write, erase, inverse or overstrike. The fourth bit controls the direction of an increment circuit composed of AND gates 72 and 73 by using true and complement outputs of a binary. Data pattern register 50 contains the character data pattern that is to be written on the display panel. The character data pattern consists of eight bits. The output of data register 50 goes to an exclusive OR gate 76 which can invert the data pattern depending upon a proper command from mode register 51. The output from data register 50 also goes to overstrike bypass 74. Overstrike bypass 74 allows nothing to get changed in the background area of the display panel but causes the logic circuitry to react as if the display panel responded to a command. Counter 55 is an 8-bit counter which provides the microprocessor 31 (FIG. 2) with an interrupt when data register 50 has completed shifting the data contained therein. Counter 53 is a 512-bit counter which is used during the drawing or plotting of a vector on the display panel. Counter 53 provides microprocessor 31 with an interrupt as does counter 55 and in addition provides a calculate signal which appears on line 307 and is used to advance summing registers that are used when a vector is being drawn. The summing registers are illustrated in FIG. 6.

An interrupt signal is provided by AND gate 67, from an input from OR gate 68, which signal goes to the microprocessor 31 on line 305 when the display panel has indicated that it is ready for new information and when both counters 55 and 53 have completed a counting sequence. The display panel indicates when it is ready for new information by sending a status signal back on line 60 into OR gate 66. The output of OR gate 66 is fed to another OR gate 64 also having an input from control decoder 61. The output of OR gate 64 is used as a set input to flip-flop 63. The output of flip-flop 63 goes to timing control 62. Timing control 62 receives timing pulses on line 308 from clock generator 32 (FIG. 2). The status signal from the display panel which is carried on line 60 serves to clear all of the panel interface control registers 77 and to enable timing control 62. Three sequential timing signals are generated by timing control 62. The first signal clears the enable signal by resetting flip-flop 63. The second signal causes data register 50 to shift and also clocks counters 53 and 55. The third signal goes to AND gate 71 where it is ANDed with an inverted output from counter 55. The output of counter 55 is inverted by inverter 69. The output of AND gate 71 then causes increment output signals to be generated by AND gates 72 or 73 in the X or Y directions as determined by mode register 51. An increment Y signal is generated on line 306A while an increment X signal is generated on line 306B.

Data register 50 is shifted on the second timing signal and then the data is clocked into panel control registers 77 on the third timing signal. When any one of the control registers 77 has an output the display panel commences its operation cycle. The outputs of registers 77 are erase, write, and bulk erase. Mode register 51 stores a display mode signal which is fed to exclusive OR gate 76 which causes the data from data register 50 to either be inverted or not inverted. In the overstrike or erase mode the character background matrix is not disturbed and therefore no signals are sent to panel control registers 77. The overstrike bypass circuitry 74, however, causes a pseudo status signal to be generated to enable timing control 62.

One panel interface unit was built using the following components:

- Data Register 50 — Parallel-in-Serial-out Shift Register 74165
- Mode Register 51 — Quad Latch 7475
- Counter 53 — Synchronous Up/Down Counters with Mode Control 74191. Three 74191's were used along with some NAND gates.
- Counter 55 — Four-Bit Binary Counter 7493
- Timing Control 62 — Four-Bit Bi-Directional Universal Shift Register 74194

Standard alpha-numeric characters are constructed with a 7 × 9 address or dot matrix format. In the plotting sequence, the character generator positions the 7 × 9 character within an 8 × 16 dot matrix which provides line-to-line and column-to-column spacing between characters. The 8 × 16 dot or point matrix also provides spacing required for below the line descenders on lower case letters.

The method of generating standard characters is for the microcomputer to receive a character code from the I/O interface or from an internal program. The microcomputer multiplies the character code by eight and adds an address offset which equals a memory address in ROM containing the start of the character pattern. The microcomputer fetches an entire row of character pattern data and sends the data eight bits at a time to data register 50. When the eight points or addresses of the row have been plotted, counter 55 sends an interrupt to the microcomputer so the microcomputer can send the next eight bits in the pattern. This continues until the pattern data for all the rows has been sent.

The method of generating a special character is different than the method for generating a standard character. A special character is constructed with an 8 × 16 address or point matrix format within an 8 × 16 point matrix format. The special character is plotted by columns whereas the standard character is plotted by rows. The microcomputer receives the special character code from the I/O interface and multiplies the special character code by sixteen and then adds an address offset which yields the starting address in RAM for the special character pattern. The microcomputer then fetches one-half column of data from RAM and sends the data to data register 50 where it is processed for plotting on the display panel. The second one-half column of data is then handled in a similar manner. This procedure is repeated until all eight columns of data have been plotted.

Referring now to FIG. 6 there is illustrated in block diagram form a vector generator and display panel address registers. For the generation of a vector on the display panel, delta registers 80 and 81, adders 82 and 83, and summing registers 84 and 85 are used in conjunction with panel address registers 88 and 89. The present address or location on the display panel is read into microprocessor 31 (shown in FIG. 2) through buffer 90. The difference between the present address and the destination or final address is computed by the microprocessor. This difference is loaded into delta registers 80 and 81 and is an indication of the slope of the line to be drawn to form a vector. Once the vector computation has been started, the contents of delta registers 80 and 81 are successively added by adders 82 and 83 to the contents of the summing register 84 and 85, respectively. Delta register 80, adder 82, and summing register 84 are used to control the plotting in the X direction, while delta register 81, adder 83, and summing register 85 are used to control plotting the vector in the Y direction. Whenever summing register 84 overflows, it sends a signal to X address register 88 to increment register 88 by one. Likewise when summing register 85 overflows it causes Y address register 89 to be incremented by one. Counter 53 (FIG. 5) generates the calculate signal on line 307 which is fed into summing registers 84 and 85 which cause the summing registers to add the contents of the corresponding delta regiser 511 times.

Address register control decoder 87 is shown as two separate portions only for ease of illustration. Decoder 87 controls where data goes and performs other control functions such as incrementing or decrementing counters and presetting registers.

Address registers 88 and 89 are parallel loadable. That is, they can be loaded under control of the microprocessor and the decoder 87. Two nine-bit numbers may be loaded into the address registers. This capability is useful in various terminal modes including dark vector mode and single address plot mode. The dark vector mode is a change of panel address with no change of displayed information.

Delta registers 80, 81 and summing registers 84, 85 are each composed of D-type flip-flops. Other components that can be used are:

Adders 82, 83 — three Four-Bit Binary Adders with Fast Carry 7483

Address Registers 88, 89 — three Synchronous Up/Down Counters with Mode Control 74191

Buffer 90 — two National Semiconductor DM-8097.

Address registers 88, 89 each have outputs going to two different locations. A first output goes to buffer 90, discussed hereinabove, while a second output goes to display unit 11. The outputs going to display unit 11 (FIG. 1) each go through a buffer which are not shown.

The microcomputer provides to the vector generation circuitry, the vector length information and the signals to start plotting. The method of generating a vector is to receive final point information from the input/output interface or from an internal program which indicates the X and Y end point addresses. The present X and Y addresses are sent to the microcomputer. The microcomputer calculates the delta X slope by subtracting the present X address from the final X address and also calculates the delta Y slope in a similar manner, i.e., subtracting the Y present address from the Y final address. The microcomputer also determines a direction of change and sets a direction flip-flop and then writes the X slope into delta register 80 and the Y slope into delta register 81. The microcomputer also presets summing registers 84 and 85 to one-half. Summing registers 84, 85 overflow upon reaching a count of one, therefore, by presetting the registers to an offset of one-half the overflow will occur when data equaling one-half has been entered. A digital half interval approximation method is used. The contents of delta registers 80 and 81 are then successively added to summing registers 84 and 85 respectively. Any time summing registers 84 or 85 overflow, X or Y address registers 88 or 89 are incremented respectively. The summing operation is then repeated for 511 times which equals the number of addresses minus one in each coordinate axis of the display panel used.

It is common knowledge that a straight line or vector can be described by the slope-intercept form equation $Y = M + B$ where Y is any instantaneous Y value, X is any instantaneous X value, M is the slope of the line or vector and is constant for any given line or vector, and B is a Y-intercept constant determined by some known values of X and Y. A line can also be described by the point-slope form equation $M = (X-X_1)/(Y-Y_1)$, which is useful when the slope M and one point $(X_1, Y_1)$ on the line are known. This latter equation can be rewritten as $M = \Delta X/\Delta Y$. Since the start or current location (address) of the line is known, the problem then becomes how to apply the above equations to find all points (addresses) which lie on a line from the start address to the end address.

To accomplish this, the microcomputer of the present invention calculates the slope M of the line as the destination address minus the current address, i.e. the known start or current location (address) of the line is subtracted from the end or final location (address) of the line. The slope M can also be thought of as the change in X divided by the change in Y ($\Delta X/\Delta Y$) for purposes of this discussion in spite of the fact that this division never actually takes place in the invention. Both the numerator and the denominator of the slope expression can also be divided by a constant such as 512 (which is equivalent to multiplying M by 1), so that each $\Delta$ value may be considered as a fraction (less than 1) without changing the ratio or value of M, i.e. the slope M can be expressed in terms of parts per 512 or considered $(\Delta X/512)/(\Delta Y/512)$. The number value 512 is a function of the display panel used (panel 11 of FIG. 1) and in the particular embodiment described consists of a viewing matrix grid having 512 lines in each of the X and Y directions. Note that there are 511 intervals from lines 1 to 512, i.e. 511 intervals between integers over the range 1 to 512.

Now assume that the microcomputer has calculated the X and Y components of the slope of a vector and that these values are in the registers 80, 81. Consider these values in fractional form as previously described. If we integrate over the integers 1 to 512 (511 intervals), we would like to find those points (addresses) on the line (vector) and finish at the endpoint of that line (vector). Each point (address) indicates the intersection of an X and Y grid line on the display panel and at which intersection point the panel is illuminated. Since $\Delta X$ and $\Delta Y$ are now considered to be in fractional form, we define a change in address (finding the next point on the line) as the time at which the summation (integration) crosses $\frac{1}{2}$. By initializing the summation registers 84, 85 to $\frac{1}{2}$, i.e. adding $\frac{1}{2}$ before we begin integration, the change occurs when the summation exceeds 1, i.e. an overflow of the summation registers 84, 85. Note that summation of X and summation of Y are concurrent, therefore changes in X and Y addresses resulting from summations of the Δ registers and true ratioed changes as a result of the slope of the line. The X and Y address changes are processed by the respective address registers 88, 89 and the incrementation of the respective addresses translates into the illumination of the next succeeding point on the line vector as it continues to be drawn on the display panel. That is, for example, assuming the most recent X and Y addresses are, respectively, $X = 1$ and $Y = 3$, incrementation of both registers 88, 89 by one unit will cause the next point on the line vector to be illuminated at display grid coordinates (2,4).

Since the display panel of the particular embodiment utilizes 512 × 512 discreet points (addresses) and since this implies 511 intervals, the described circuitry and the described theory of operation guarantee that after 511 iterations (summing operations), the end point of the line or vector is reached. The same processing operations could be applied to any discreetly addressed display device by changing the number of summing iterations to $N - 1$, where N is the number of elements (addresses) in the X or Y direction.

Figure 7:
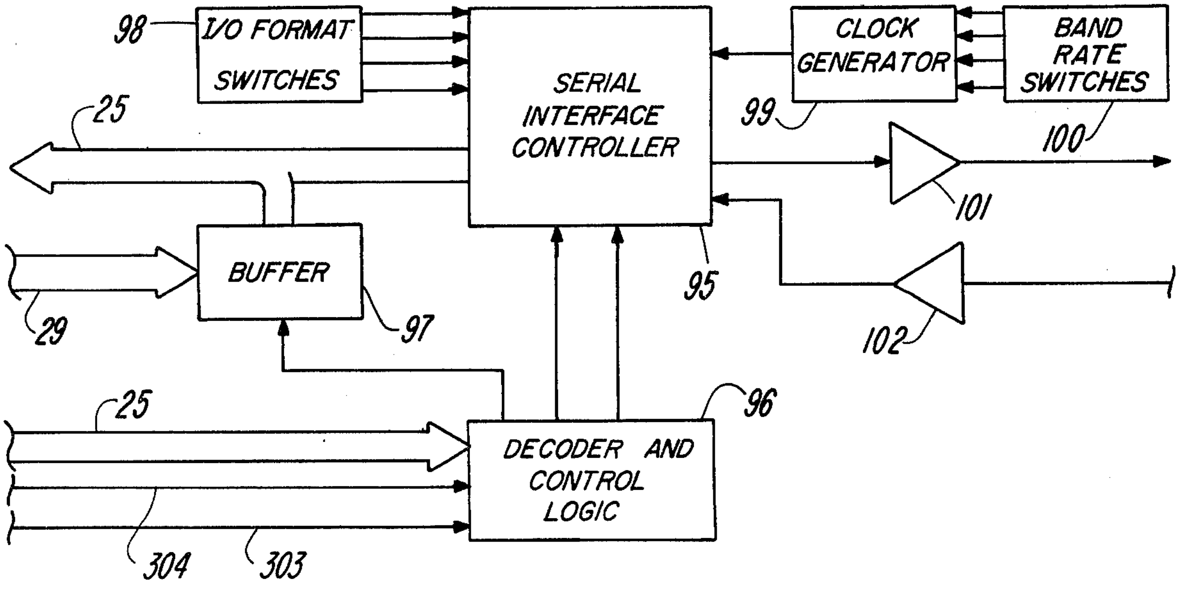
FIG. 7 illustrates in block diagram form the input/output (I/O) interface of the display panel.

The input/output interface 18 (FIG. 1) for the display terminal is illustrated in block diagram form in more detail in FIG. 7. Buffer 97 is used to interface with a keyboard input via line 29. A serial interface controller 95 is used which can convert 8-bit parallel data into serial transmitted data or can convert serial received data into 8-bit parallel data for transmission to the microprocessor. Serial interface controller 95 is controlled by the microprocessor through decode and control logic 96. Line driver 101 serves as a driver for output signals from serial interface controller 95 while line receiver 102 acts as a buffer for data received. Line driver 101 and line receiver 102 provide the interface for a central computer or modems where telephone lines are used to communicate with a computer located a great distance away. Input/output format switches 98 are selection switches which provide the capability of interfacing with several different data formats. Selection switches 98 control such variable parameters as parity, number of stop bits etc. Clock generator 90 is used to provide a frequency which corresponds to the rate being transmitted and/or received. Clock generator 99 may in turn be controlled to set its output frequency through baud rate switches 100. Baud rate switches 100 provide the capability to select a desired baud rate. The interface unit provides the capability of interfacing with various computers having different formats and baud rates. This particular interface can be used for communicating to and from a device using serial, asynchronous, ASCII, EIA RS-232C data formats.

Components that can be used in this I/O interface are:

- Controller 95 — SMC Universal Asynchronous Receiver Transmitter (UART) COM 2502
- Buffer 97 — National Semiconductor Dm-8098
- Clock Generator 99 — National Semiconductor Baud Rate Generator MM 5307 AA/N; this component requires an external crystal.

It will now be appreciated that we have provided a display terminal that is capable of being adapted to various functional requirements such as interface formats, alternate command structures and various performance capabilities. Processing programs and character generation data are stored in low cost masked read only memories (ROM) while the control program is implemented by using a programmable read only memory. The control program provides the firmware interface between the terminal inputs and the display panel. The basic routines required to draw a line, plot a character, store character data or store an executable program are contained in the ROM's. The control program calls out these routines based upon its interpretation of input signals. As an example, the routines may be executed in different sequences or respond to different stimulus, such as when operating with a system using the ASCII code, a specific code could cause the character "A" to be displayed. In a system using a different coding scheme the character "A" may be displayed in response to an entirely different code. The control program allows the translation between codes and calls the same fixed processing routines in response to the different input codes.

Another advantage of the present invention is its ability to be programmed by a central computer. This feature has a significant impact on the system of which the display terminal may be a part. It is important in many computing systems to minimize the amount of calculation required by the central computer in order to command the display terminal to perform a given function. This is so because the system may contain many display terminals or other peripheral devices all simultaneously competing for the computing resources of the central computer. With the present display terminal, the load on the central computer can be reduced because the display terminal can store data in such a way that it can later use it as an executable program. The program thus loaded can be used as a subroutine by the central computer in highly repetitive computations or serve as the entire program required by the display terminal. In the latter case, an operator may enter data at the terminal and have it processed and displayed locally without being serviced at all by the central computer. This permits the display terminal to operate independently until a new algorithm or type of computation is desired.

The use of the selected microprocessor and its related circuitry in the present display terminal results in potential reduction of the number of circuit components required to perform the necessary terminal functions. In summary, the present display terminal is easily and simply alterable to be compatible with virtually any system interface format. This includes cases where codes within a format are to be interpreted in a different manner and/or where the system coding format is different. The terminal as described is programmable thereby helping ease capacity requirements on the systems central computer. And further, the display panel makes use of state of the art components to take advantage of the cost reduction afforded by high density integrated circuits.

Consequently, while in accordance with the Patent Statutes, we have described what at present are considered to be the preferred form of our invention it will be obvious to those skilled in the art that numerous changes and modifications may be made herein without departing from the spirit and scope of the invention, and it is therefore aimed in the following claims to cover all such modifications.

What we claim as new and desire to secure by Letters Patent of the United States is:

1. An improved display terminal of a type having a matrix addressable display panel, a microcomputer and means to input information, wherein the improvement comprises a vector generator having a delta register to contain a slope of a vector to be generated, a summing register to which are successively added contents from the delta register, an address register to contain an address indicative of a location on the display panel and which is incremented each time the summing register overflows, a bit counter with a capacity equal to the number of addresses for one coordinate of the display panel, the bit counter having a first output coupled to the summing register to cause the summing register to perform a summing operation a predetermined number of times equal to the number of addresses for one coordinate, the bit counter having a second output coupled to the microcomputer, said second output being indicative of the summing register having completed all of the summing operations for indicating to the microcomputer completion of generation of the vector.

2. The improved display terminal of claim 1 further comprising a control read only memory that determines a set of subroutines which make up characteristics of the display terminal.

3. The improved display terminal of claim 1 further comprising a character generator having a mode register to store commands enabling the display panel to write and erase, a data register to contain data indicative of a character to be displayed on the display panel, a counter having an output coupled to the microcomputer to signal the microcomputer completion of displaying the data contained in the data register, a timing control circuit to shift data registers and to clock the counter, the timing control circuit receiving timing pulses from the microcomputer, and the mode register and data register being supplied inputs from the microcomputer.

4. The improved display terminal of claim 2 wherein the timing control circuit has means to receive a signal from the display panel, which signal indicates readiness of the display panel to receive information to be displayed and which enables the timing control circuit.

5. A display terminal having a matrix addressable display panel, an address bus, a data bus, and a control bus for interfacing with various portions of the display terminal, the various portions comprising: a microcomputer having a microprocessor, a timing pulse generator coupled to the microprocessor to provide clocking pulses to the microprocessor, a stack memory coupled to the microprocessor to serve as a temporary storage location for program variables, a status register to indicate status of the data and address buses, the status register being coupled to the microprocessor, and means to provide control signals to other portions of the display terminal; memory means having read/write memory and read only memory; a vector generator for generating signals to draw a line on the display panel and having at least a first and a second delta register to contain slope information of the line, at least a first and a second summing register to which are successively added contents from the delta registers, the first delta register being coupled to the first summing register and the second delta register being coupled to the second summing register, and at least a first and a second address register to contain an address indicative of a location on the display panel, the first address register being incremented whenever the first summing register overflows and the second address register being incremented whenever the second summing register overflows; a display panel controller having a first counter capable of counting up to a number equal to the number of possible addresses in one coordinate of the display panel, the first counter having a first output coupled to the first and second summing registers, a second counter capable of counting up to the number of character processed for displaying on the display panel, the first and second counters having outputs coupled to the microcomputer to indicate to the microcomputer completion of a predetermined counting sequence, said counter outputs indicating the completion of a generated vector, a mode register to temporarily store write and erase instructions for the display panel, a data register to temporarily store character generation information, and a timing controller to shift data through the mode and data registers in a sequential manner and to clock the first and second counters; and an interface unit to interface the display terminal to an external data source and to an input device which allows an operator to manually input data to the display terminal.

6. The display terminal of claim 5 wherein the first delta register contains X-coordinate information and the second delta register contains Y-coordinate information, and the first address register contains X-coordinate address information and the second address register contains Y-coordinate information.

7. A character and vector generator for selectively generating a display of characters on a matrix addressable digital display panel, the digital display panel having X-coordinate and Y-coordinate address points arranged in a matrix array and means for selectively addressing individual address points and for energizing the individual addressed points of the display panel, the character and vector generator comprising: a pattern data register to temporarily store data indicative of at least one line of pattern needed to form a character on the digital display panel; a mode register to temporarily store data to instruct the means for selectively addressing individual address points to erase and to write a selected address point; a counter to keep count of the number of data bits processed out of the pattern data register and to produce an output upon completion of processing all the data out of the pattern data register; a timing controller to shift data out of the pattern data register and mode register and to increment the counter each time data is shifted; an X and a Y delta register to store data indicative of slope of a vector to be displayed on the display panel; an X and a Y address register to contain data indicative of an address of the display panel where the vector is being plotted; an X and a Y summing register to which are successively added contents from a respective X and Y delta register; and a bit counter to count up to a number equal to the number of address in one of the coordinate axis of the display panel, the bit counter being incremented by an output from the timing controller and the bit counter in turn having an output to increment the X and the Y summing registers until the summing registers have been incremented a number of times equal to the number of addresses minus one, and the occurrence of which indicates the completion of a vector in one coordinate axis of the display panel.

8. The character and vector generator of claim 7 further having means to overstrike so that only preselected points on the display panel are written thereby displaying the desired character.

* * * * *